(12) United States Patent
Mochizuki et al.

(10) Patent No.: US 11,396,262 B2
(45) Date of Patent: Jul. 26, 2022

(54) SADDLE TYPE VEHICLE

(71) Applicant: HONDA MOTOR CO., LTD., Tokyo (JP)

(72) Inventors: Marika Mochizuki, Wako (JP); Hiroaki Uchisasai, Wako (JP); Hiroshi Maeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 47 days.

(21) Appl. No.: 16/932,122

(22) Filed: Jul. 17, 2020

(65) Prior Publication Data

US 2020/0346704 A1  Nov. 5, 2020

Related U.S. Application Data

(63) Continuation of application No. PCT/JP2018/004836, filed on Feb. 13, 2018.

(51) Int. Cl.
| | |
|---|---|
| *B62J 6/022* | (2020.01) |
| *B60Q 9/00* | (2006.01) |
| *B60Q 1/34* | (2006.01) |
| *B62J 6/056* | (2020.01) |
| *B62J 45/41* | (2020.01) |

(Continued)

(52) U.S. Cl.
CPC .............. *B60Q 9/008* (2013.01); *B60Q 1/346* (2013.01); *B62J 6/022* (2020.02); *B62J 6/056* (2020.02); *B62J 6/26* (2020.02); *B62J 27/00* (2013.01); *B62J 45/41* (2020.02); *B60Q 2300/112* (2013.01); *B60Q 2300/142* (2013.01); *B60Y 2200/12* (2013.01)

(58) Field of Classification Search
CPC .... B60Q 1/346; B60Q 1/38; B60Q 2300/112; B60Q 2300/142; B60Q 2400/50; B60Q 9/008; B60Y 2200/12; B62J 45/41; B62J 6/022; B62J 6/05; B62J 6/056; B62J 6/26
See application file for complete search history.

(56) References Cited

U.S. PATENT DOCUMENTS 9,315,146 B2    4/2016  Purks et al.
9,896,107 B1 *  2/2018  Huang .................. B60W 50/14
(Continued)

FOREIGN PATENT DOCUMENTS

JP    2008155767 A     7/2008
JP    2016193689 A    11/2016
(Continued)

OTHER PUBLICATIONS

English Machine Translation of JP 2008155767A provided by ESPACENET (Year: 2008).*

(Continued)

*Primary Examiner* — Zheng Song
(74) *Attorney, Agent, or Firm* — Thomas | Horstemeyer, LLP

(57) ABSTRACT

An invention is a saddle type vehicle comprising a lighting device, and an operator configured to perform a driving operation of a direction indicator, characterized in that the lighting device is configured to irradiate a part of a road surface on a front to lateral side of the saddle type vehicle in accordance with input of an operation of showing an intention of route change to the operator by a driver of the saddle type vehicle.

15 Claims, 9 Drawing Sheets

(51) Int. Cl.
 *B62J 6/26* (2020.01)
 *B62J 27/00* (2020.01)

(56) References Cited

U.S. PATENT DOCUMENTS

| | | | |
|---|---|---|---|
| 10,134,280 B1* | 11/2018 | You | B60Q 1/34 |
| 10,137,827 B2 | 11/2018 | Kurata | |
| 2005/0117364 A1* | 6/2005 | Rennick | B60Q 1/2665 |
| | | | 362/540 |
| 2013/0010484 A1 | 1/2013 | Son et al. | |
| 2013/0335212 A1* | 12/2013 | Purks | B60Q 1/38 |
| | | | 340/435 |
| 2017/0101147 A1 | 4/2017 | Hasegawa | |
| 2017/0140651 A1* | 5/2017 | Lee | G01C 21/365 |
| 2017/0253177 A1* | 9/2017 | Kawamata | B60Q 9/008 |
| 2017/0355300 A1 | 12/2017 | Kurata | |
| 2018/0004020 A1* | 1/2018 | Kunii | B60Q 1/34 |
| 2018/0093607 A1* | 4/2018 | Omanovic | B60Q 1/22 |
| 2018/0260182 A1* | 9/2018 | Suzuki | G09G 5/40 |
| 2018/0334089 A1* | 11/2018 | Huang | B60Q 5/006 |
| 2019/0322209 A1* | 10/2019 | Sugiyama | F21S 41/43 |
| 2019/0389370 A1* | 12/2019 | Kawaguchi | H04N 9/73 |
| 2020/0039594 A1* | 2/2020 | Ebrahemi | B62K 19/40 |
| 2020/0189454 A1* | 6/2020 | Boilevin | B60Q 1/50 |

FOREIGN PATENT DOCUMENTS

| | | |
|---|---|---|
| JP | 2017074820 A | 4/2017 |
| JP | 2017218133 A | 12/2017 |
| WO | 2019159220 A1 | 8/2019 |

OTHER PUBLICATIONS

International Search Report for PCT/JP2018/004836 dated Mar. 27, 2018.
IPRP for PCT/JP2018/004836 dated Nov. 5, 2018.

* cited by examiner

FIG. 4C1
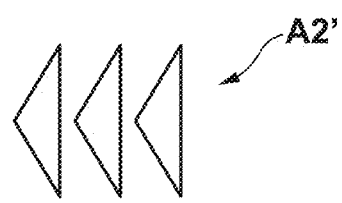
FIG. 4C2
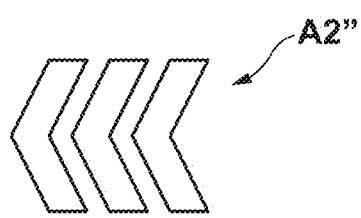

SADDLE TYPE VEHICLE

CROSS-REFERENCE TO RELATED APPLICATION(S)

This application is a continuation of International Patent Application No. PCT/JP2018/004836 filed on Feb. 13, 2018, the entire disclosures of which is incorporated herein by reference.

TECHNICAL FIELD

The present invention relates to a saddle type vehicle.

BACKGROUND ART

PTL 1 describes irradiating a part of a road surface behind a self-vehicle to cause an occupant of another vehicle behind the self-vehicle to recognize the existence of the self-vehicle. According to PTL 1, the irradiation form is changed in accordance with the distance between the self-vehicle and the other vehicle, thereby causing the occupant of the other vehicle to appropriately recognize the existence of the self-vehicle and implementing safer driving.

CITATION LIST

Patent Literature

PTL 1: Japanese Patent Laid-Open No. 2017-218133

SUMMARY OF INVENTION

Technical Problem

When a vehicle changes its route, for example, changes the traveling lane to an adjacent lane, the driver operates a turn signal (direction indicator) to show the intention of route change to another person such as a pedestrian or an occupant of another vehicle. This also applies to a saddle type vehicle such as a motorcycle.

In a case of a general vehicle (for example, a four-wheeled vehicle) whose vehicle body is larger than a saddle type vehicle, there exist relatively many dead angle positions for the occupant of the general vehicle. Hence, the intention of route change of the rider who is the driver of the saddle type vehicle is sometimes hardly recognized by the occupant of the general vehicle. Additionally, whether the intention of route change is actually being indicated by the self-vehicle or not is an important determination material for the rider when executing a route change, and this affects the driving burden on the rider.

It is an object of the present invention to cause another person to appropriately recognize an intention of route change of a self-vehicle in a relatively near future and reduce a driving burden on a rider.

Solution to Problem

According to the first aspect of the present invention, there is provided a saddle type vehicle, and the saddle type vehicle is a saddle type vehicle comprising a lighting device, and an operator configured to perform a driving operation of a direction indicator, characterized by further comprising a detection unit configured to detect presence/absence of an object on the periphery of the saddle type vehicle, wherein the lighting device is configured to irradiate a front side of the saddle type vehicle with first information representing a route change in accordance with input of an operation of showing an intention of route change to the operator by a driver of the saddle type vehicle, irradiate a lateral side of the saddle type vehicle with second information representing the route change if an object is not detected in a region on a rear lateral side of the saddle type vehicle by the detection unit, and suppress irradiation of the second information to the lateral side of the saddle type vehicle if the object is detected in the region on the rear lateral side by the detection unit.

Advantageous Effects of Invention

According to the present invention, it is possible to cause another person to appropriately recognize an intention of route change of a self-vehicle in a relatively near future and reduce a driving burden on a rider.

BRIEF DESCRIPTION OF DRAWINGS

FIG. 4C1 is a view for explaining an example of a symbol irradiated to a road surface;

FIG. 4C2 is a view for explaining an example of a symbol irradiated to a road surface;

DESCRIPTION OF EMBODIMENTS

Figure 1A:
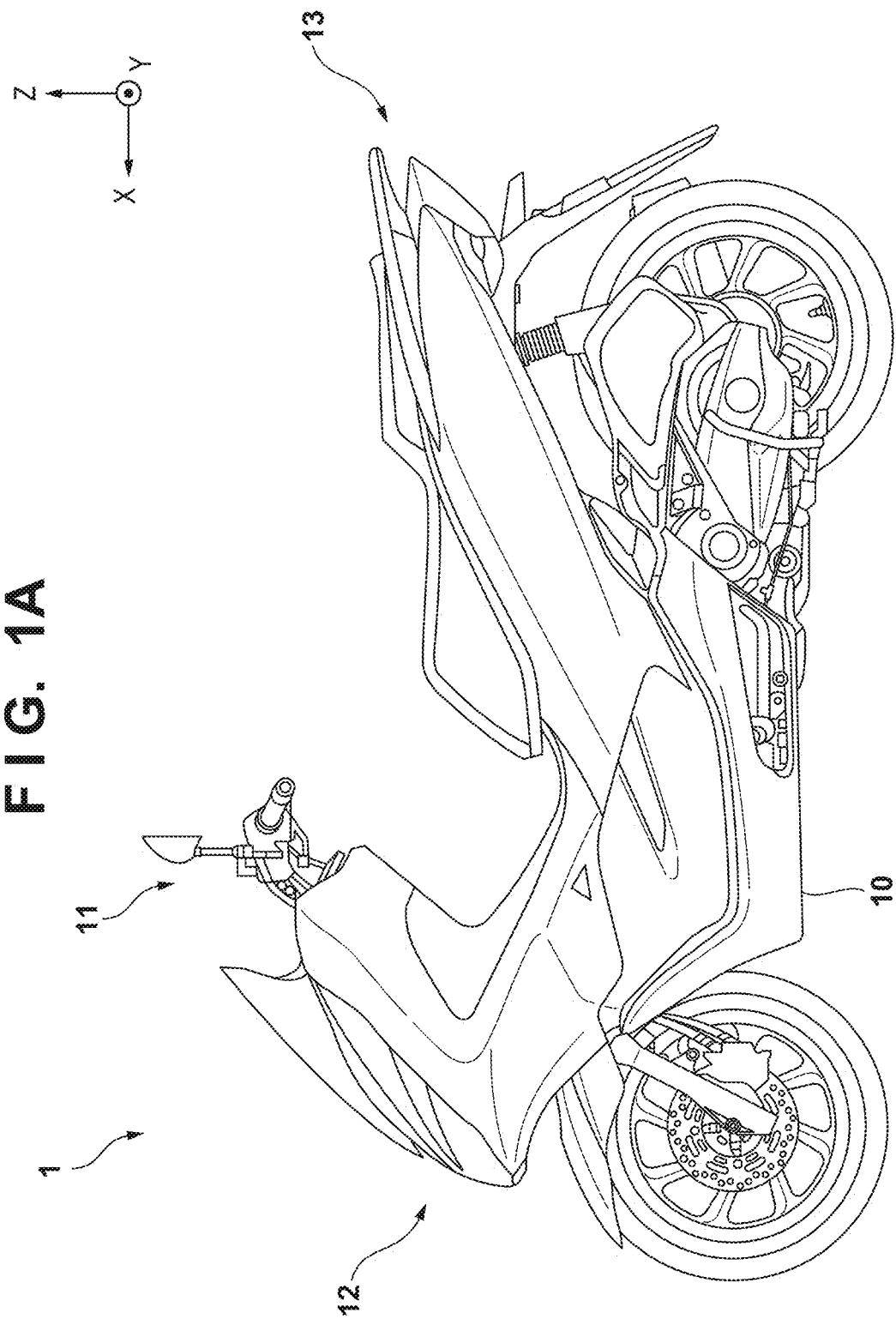
FIG. 1A is a schematic view for explaining an example of the structure of a two-wheeled vehicle.

An embodiment of the present invention will now be described with reference to the accompanying drawings. Note that the drawings are schematic views showing the structure or arrangement of the embodiment, and the dimensions of illustrated members do not necessarily reflect actuality. The same reference numerals denote the same elements throughout the drawings, and a description of repetitive convents in this specification will be omitted.

Figure 1B:
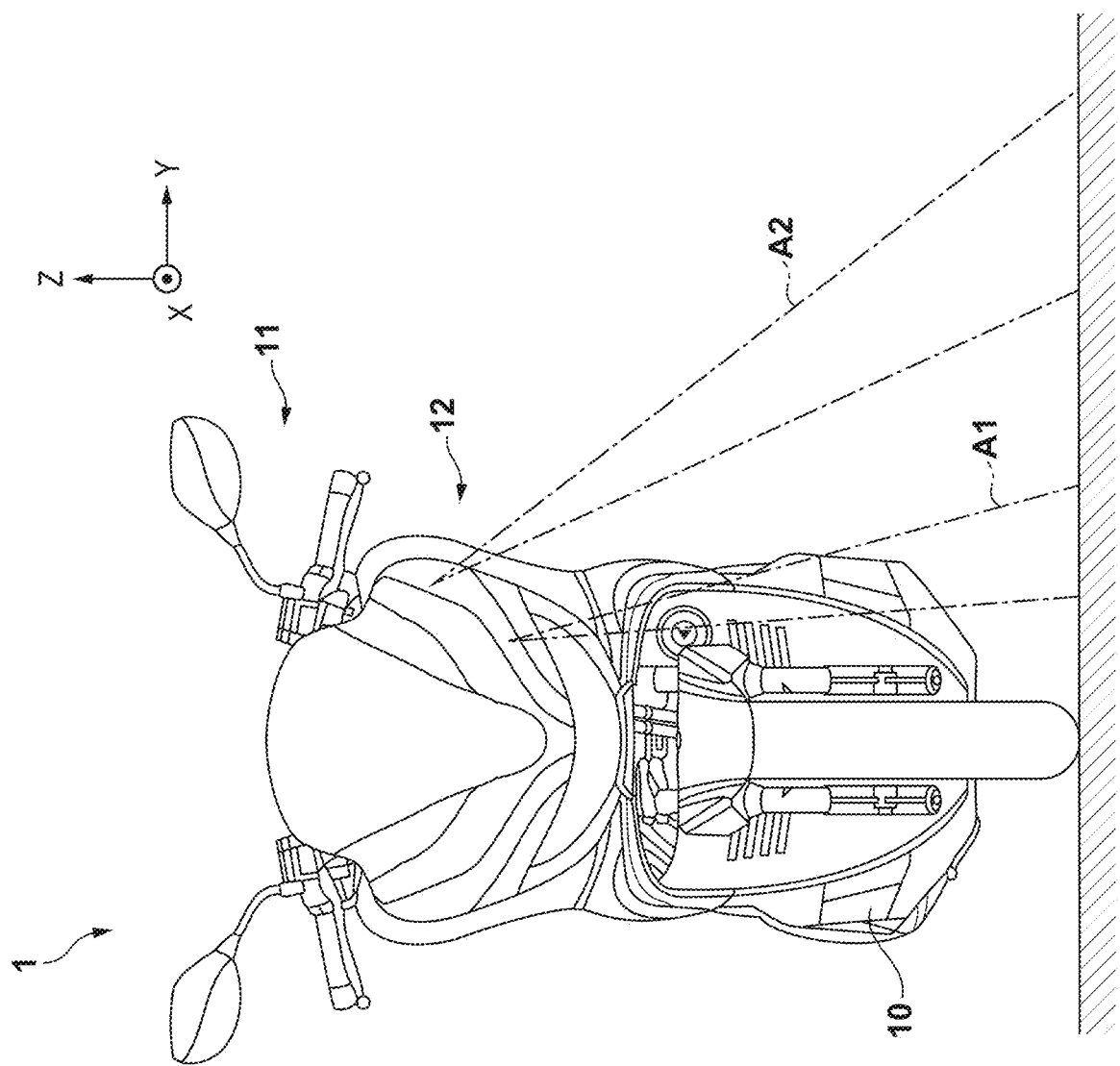
FIG. 1B is a schematic view for explaining an example of the structure of the two-wheeled vehicle.
Figure 2:
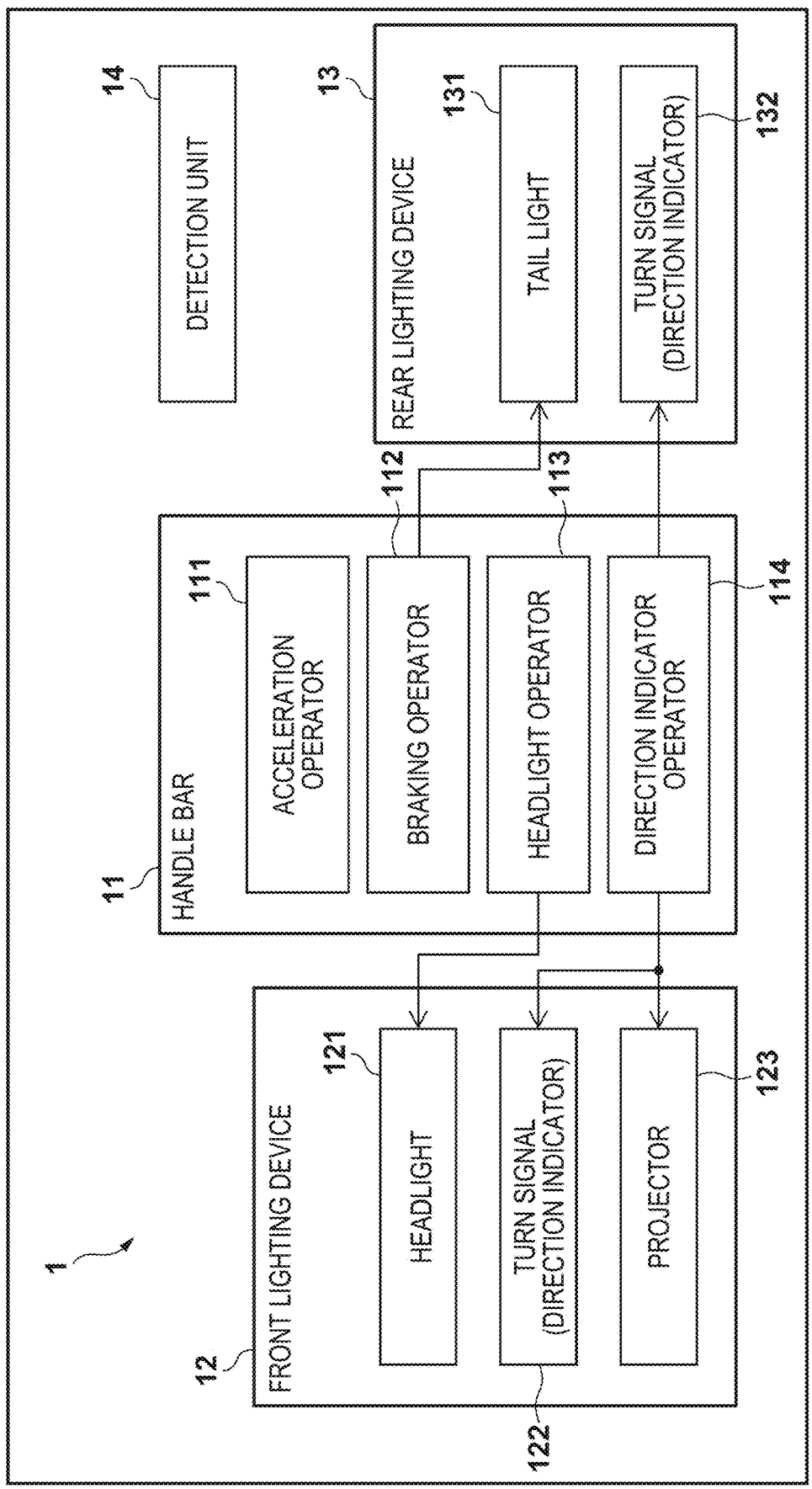
FIG. 2 is a block diagram for explaining an example of the arrangement of the two-wheeled vehicle.

FIG. 1A is a side view of a motorcycle (to be simply referred to as a "two-wheeled vehicle" hereinafter) 1 as an example of a saddle type vehicle according to the embodiment. FIG. 1B is a front view of the two-wheeled vehicle 1. Note that an X direction represents the longitudinal direction of the vehicle body, a Y direction represents the left-and-right direction of the vehicle body, and a Z direction represents the up-and-down direction of the vehicle body. FIG. 2 shows a part of the system arrangement of the two-wheeled vehicle 1.

The two-wheeled vehicle 1 includes a handle bar 11, a front lighting device 12, and a rear lighting device 13. The handle bar 11 can pivot with respect to a vehicle body 10, and a rider who is the driver of the two-wheeled vehicle 1 can perform s steering operation by making the handle bar 11 pivot. An acceleration operator 111, a braking operator 112, a headlight operator 113, and a direction indicator operator 114 are provided on the handle bar 11. These are attached to positions to easily operate for the rider. The front lighting device 12 is provided to form the front portion of the vehicle body of the two-wheeled vehicle 1, and includes a headlight 121, a turn signal (direction indicator) 122, and a projector 123. The turn signal 122 and the projector 123 each include a pair of left and right devices in the front portion of the vehicle body. The rear lighting device 13 is provided to form the rear portion of the vehicle body of the two-wheeled vehicle 1, and includes a tail light 131 and a turn signal (direction indicator) 132. The turn signal 132 includes a pair of left and right devices in the rear portion of the vehicle body.

Here, the acceleration operator 111 is an accelerator grip provided at an end portion of the handle bar 11, and the rider can perform an acceleration operation by making the accelerator grip pivot. Here, the braking operator 112 is a brake bar provided on the front side of the accelerator grip, and the rider can perform a braking operation by operating the brake bar. Note that another braking operator different from the braking operator 112 is provided on the lower side of the vehicle body, and the rider can also perform the braking operation by the other braking operator as well, although a detailed description thereof will be omitted here. If the braking operation is performed by the rider, the tail light 131 is turned on.

The headlight operator 113 is, for example, a switch type operator used to change the irradiation direction of the headlight 121, and enables switching of high beam/low beam. The direction indicator operator 114 is, for example, a switch type operator used to perform a driving operation of the turn signals 122 and 132, and is used to make intention display to another person (third party) on the periphery of the self-vehicle when performing a route change such as a left turn, right turn, or lane change.

As will be described later in detail, the projector 123 irradiates a part of a traveling road surface when the rider has operated the direction indicator operator 114 (when the driving operation of the turn signals 122 and 132 is performed).

As shown in FIG. 2, the two-wheeled vehicle 1 further includes a detection unit 14 configured to detect (or may be expressed as monitor or the like) the peripheral environment on the periphery of the self-vehicle. The detection unit 14 includes various kinds of sensors such as, for example, a camera, a millimeter wave radar, and a laser radar (LiDAR (Laser Imaging Detection and Ranging)), although a detailed description thereof will be omitted here. The various kinds of sensors are attached to the front and rear portions of the vehicle body and additionally to the lateral sides of the vehicle body. Using the detection unit 14, the two-wheeled vehicle 1 can detect the peripheral environment on the periphery of the self-vehicle and detect, for example, the presence/absence of an object (a predetermined object whose contact should be avoided, for example, another vehicle, a pedestrian, a falling object, or the like) on the front, rear, and lateral sides of the self-vehicle. This makes it possible to use the detection result of the detection unit 14 to support driving of the two-wheeled vehicle 1 and reduce a driving burden on the rider.

Figure 3:
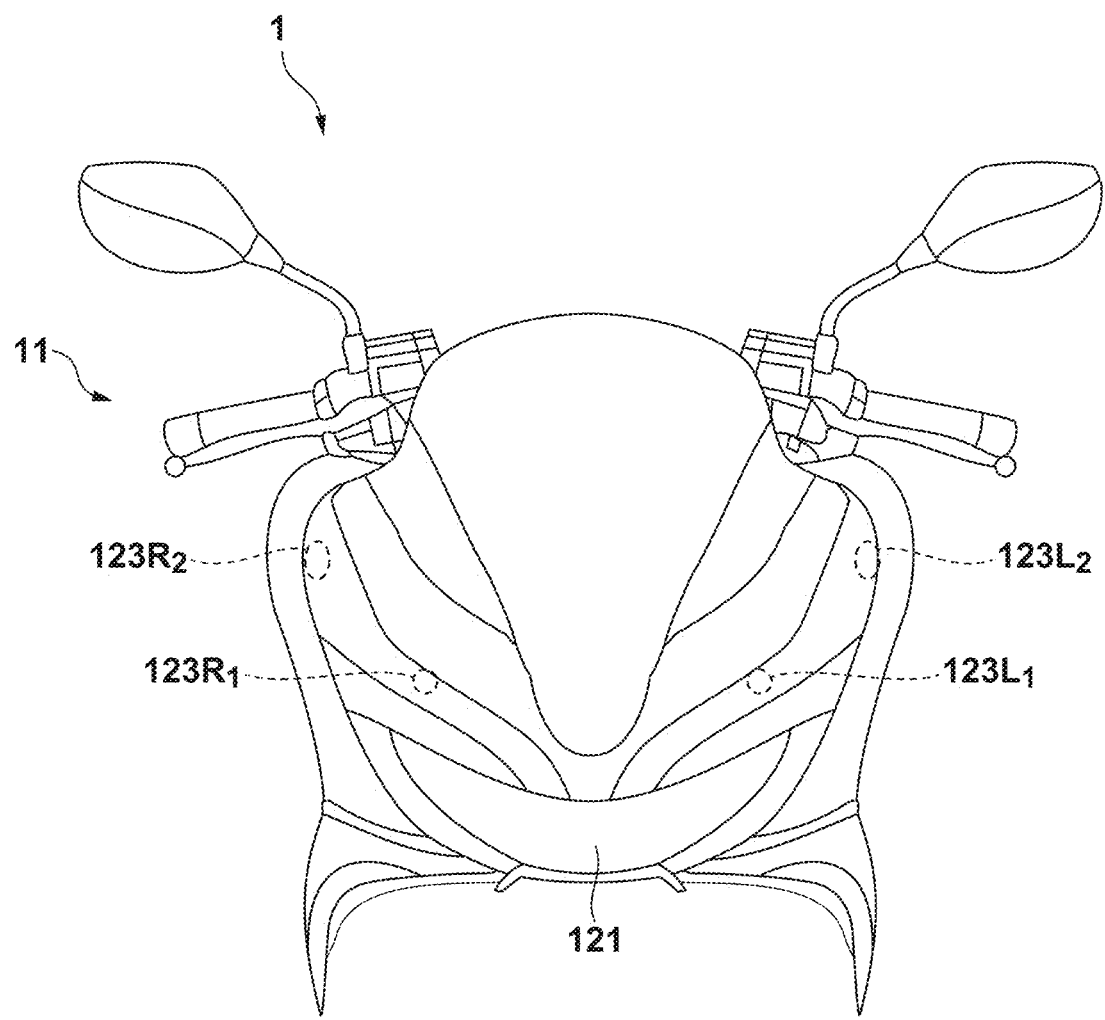
FIG. 3 is a schematic view for explaining an example of the arrangement of a lighting device.

FIG. 3 is a front view of the upper front portion of the two-wheeled vehicle 1. In this embodiment, the projector 123 includes a plurality of light sources $123L_1$, $123L_2$, $123R_1$, and $123R_2$. The light sources $123L_1$ and $123L_2$ and the light sources $123R_1$ and $123R_2$ are provided to be bilaterally symmetrical to each other with respect to the vehicle body center. As each of the light sources $123L_1$ and the like, a light source having high directivity and capable of emitting light of a brightness and color (wavelength range) visible even under daylight, for example, a projection lamp using a laser, an LED (Light Emitting Device), or the like can be applied.

Although not illustrated, the pair of left and right turn signals 122 each include a light source (for example, an LED) separated from the light sources $123L_1$ and the like, and a lightguide member that guides light from the light source. For example, the light source and the lightguide member of the turn signal 122 on the left side are arranged between the light sources $123L_1$ and $123L_2$, and the light source and the lightguide member of the turn signal 122 on the right side are arranged between the light sources $123R_1$ and $123R_2$. Alternatively, a part of the turn signal 122 may be arranged between the light sources $123L_1$ and $123R_1$. For example, a part of the lightguide member may be extended to the inner side of the vehicle body with respect to the light sources $123L_1$ and $123R_1$.

The projectors 123 are provided with drivers (not shown) capable of driving the light sources $123L_1$, $123L_2$, $123R_1$, and $123R_2$. The drivers selectively drive the light sources $123L_1$, $123L_2$, $123R_1$, and $123R_2$ based on operation contents input by the driver to the direction indicator operator 114. As will be described later in detail, for example, if the light sources $123L_1$ and $123L_2$ are driven, the road surface on the front side of the vehicle body and the road surface on the left side of the vehicle body are irradiated with the light sources $123L_1$ and $123L_2$, respectively, as shown in FIG. 1B.

Figure 4A:
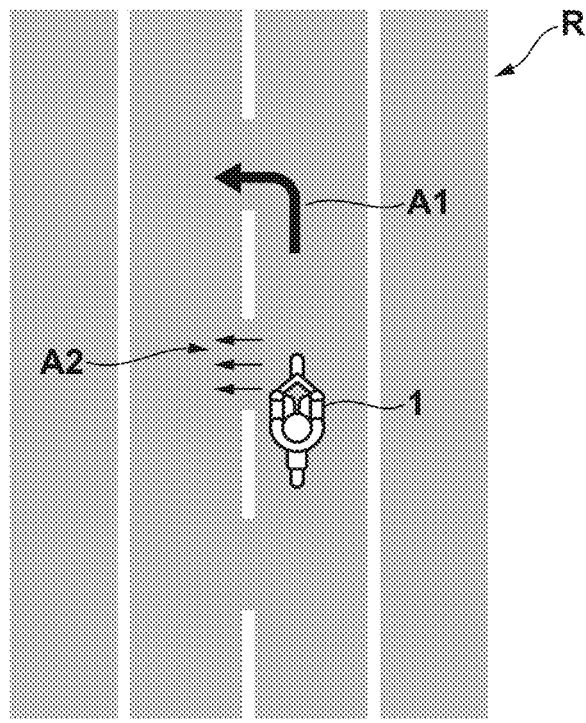
FIG. 4A is a view for explaining a state of a route change.

FIG. 4A is a schematic plan view showing, as an example of a route change by the two-wheeled vehicle 1, a state in which the two-wheeled vehicle 1 traveling on the right lane of two lanes makes a lane change to the left lane. First, the rider inputs an operation of showing an intention of a lane change to the left lane (that is, an operation of driving the turn signals 122 and 132 on the left side) to the direction indicator operator 114. In response to this operation, the driver of the projector 123 causes the light source $123L_1$ to display an arrow A1 on the road surface and causes the light source $123L_2$ to display arrows A2 on the road surface.

The arrow A1 is displayed on a part of the road surface on the front side of the two-wheeled vehicle 1, and the arrows A2 are displayed on a part of the road surface on the left side of the two-wheeled vehicle 1. Hence, it is possible to appropriately call attention to another person on the periphery of the two-wheeled vehicle 1, although not illustrated here. The arrows A1 and A2, in particular, the arrow A1 is displayed at a position to easily enter the visual field of the rider. For this reason, the rider can readily recognize the state in which the self-vehicle is displaying information representing the route change without largely changing, for example, the line-of-sight direction or the direction of the face, and the driving burden on the rider is thus reduced.

The arrows A1 and A2 may be maintained in the display state (ON state) until, for example, the operation contents input to the direction indicator operator 114 are canceled. However, the arrows are preferably displayed to blink at a predetermined period. This can more appropriately call attention to another person. When blinking the arrows A1 and A2 at a predetermined period, the turn signals 122 and 132 and the arrows A1 and A2 may blink in the same phase, or may blink with a shift of a half period.

Figure 4B:
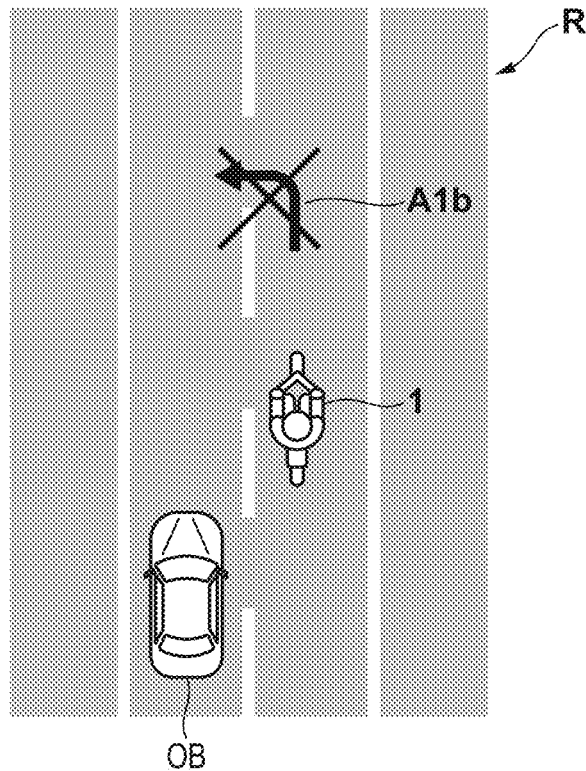
FIG. 4B is a view for explaining a state of a route change.

FIG. 4B shows a state when the two-wheeled vehicle 1 makes a lane change to the left lane, and another vehicle OB exists at a relatively close position on the rear left side of the two-wheeled vehicle 1, like FIG. 4A. As described above (see FIG. 2), the two-wheeled vehicle 1 can detect the existence of the other vehicle OB by the detection unit 14. The detection result of the detection unit 14 is output to the driver of the projector 123. Hence, if the same operation as described above is input to the direction indicator operator 114, the driver of the projector 123 can cause the light source 123L$_1$ to display an arrow A1*b* with an x mark in response to the operation. The arrow A1*b* with an x mark is a mark formed by superimposing an x mark on the above-described arrow A1.

The arrow A1*b* with an x mark is displayed on a part of the road surface on the front side of the two-wheeled vehicle 1, like the arrow A1. Hence, the rider can quickly recognize that the route change at that point of time is not recommended, and can also, for example, quickly cancel the operation contents input to the direction indicator operator 114.

The arrow A1*b* with an x mark is preferably displayed when there is a possibility that the two-wheeled vehicle 1 comes into contact with the other vehicle OB if a lane change is made. Displaying the arrow A1*b* with an x mark in place of the arrow A1 may be decided based on, for example, the distance between the two-wheeled vehicle 1 and the other vehicle OB and additionally based on the vehicle speed of the two-wheeled vehicle 1 and/or the other vehicle OB. Note that to make the arrow A1*b* with an x mark more visually recognizable, it may be displayed in a color different from the above-described arrows A1 and A2.

As for the case shown in FIG. 4B, in this embodiment, the arrow A1*b* is displayed by maintaining driving of the light source 123L$_1$, and the arrows A2 is not displayed by suppressing driving of the light source 123L$_2$. This makes it possible to prevent the occupant of the other vehicle OB from being unnecessarily confused. On the other hand, the possibility of display of the arrows A2 in such a case may be settable by the rider in advance. That is, the arrows A2 may be displayed on the road surface together with the above-described arrow A1*b* with an x mark.

In this embodiment, the light source 123L$_1$ selectively displays the arrow A1 and the arrow A1*b* with an x mark. However, the present invention is not limited to this form. For example, as another embodiment, a light source configured to display the arrow A1 and a light source configured to display the arrow A1*b* with an x mark may be provided individually. As still another embodiment, a light source configured to display the arrow A1 and a light source configured to display the arrow A1*b* with an x mark may be provided individually. One light source may display the arrow A1, and the other light source may form the arrow A1*b* with an x mark by superimposing an x mark on the arrow A1.

In the example shown in FIG. 4A, the arrows A2 are shown as one type of information displayed on the road surface by the light source 123L$_2$. However, the present invention is not limited to this symbol, and it is only needed to display a symbol that is readily visually recognizable as a symbol representing the intention of route change. As an example, a character such as an alphabetic character may be used. Alternatively, a relatively short text may be used. Preferably, a symbol or a figure with which an intention of route change can intuitively be recognized can be used.

For example, one or more triangles A2' may be used, as shown in FIG. 4C1, or "doglegged" figure A2" may be used, as shown in FIG. 4C2. Alternatively, a combination of a symbol, figure, and character may be used. Similarly, for the arrow A1 and the arrow A1*b* with an x mark as well, another symbol, figure, character, or a combination thereof may be used.

Figure 5:
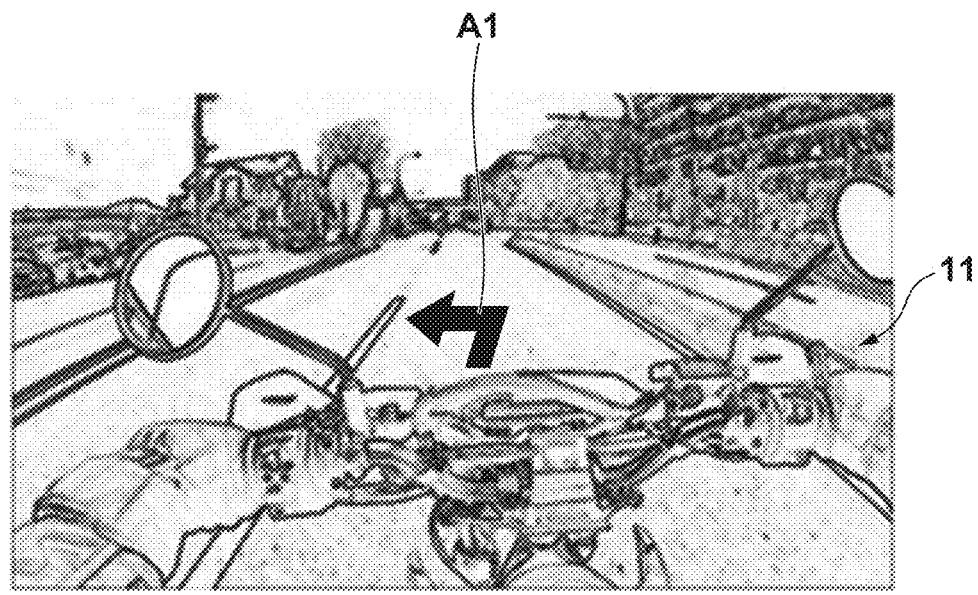
FIG. 5 is a view for explaining a state of a route change.

FIG. 5 is a view showing an example of a state in front of the two-wheeled vehicle 1 drawn from the viewpoint of the rider. The arrow A1 is preferably displayed at a position visually recognizable by the rider without largely changing the line-of-sight direction or the direction of the face, and preferably displayed at a position a predetermined distance ahead the vehicle body 10. In this case, the arrow A1 can readily visually be recognized even by the occupant of another vehicle traveling on a rear lateral side or lateral side of the two-wheeled vehicle 1. For example, the arrow A1 is preferably displayed in a region within the range of 1 m to 10 m ahead of the vehicle body 10 of the two-wheeled vehicle 1, or may be displayed in a region within the range of 3 m to 5 m ahead of the vehicle body 10. The display position may be changed in accordance with the vehicle speed of the self-vehicle, or may be changed in accordance with the distance between the self-vehicle and a preceding vehicle in front. Here, the arrow A1 indicating a route change to the left side is preferably displayed at a position shifted to the left side with respect to the vehicle body center. To allow the rider to easily visually recognize, the arrow A1 is preferably displayed at a position overlapping the handle bar 11 at least in the front-and-rear direction of the vehicle body. These also apply to the arrow A1*b* with an x mark.

A case in which the two-wheeled vehicle 1 makes a lane change to the left lane has been described above. This also applies to a case in which a left turn is performed at an intersection or the like. The above description also applies to a case in which the two-wheeled vehicle makes a lane change to the right lane or makes a right turn. In this case, the driver of the projector 123 drives the light source 123R$_1$ and additionally further drives the light source 123R$_2$.

Figure 6:
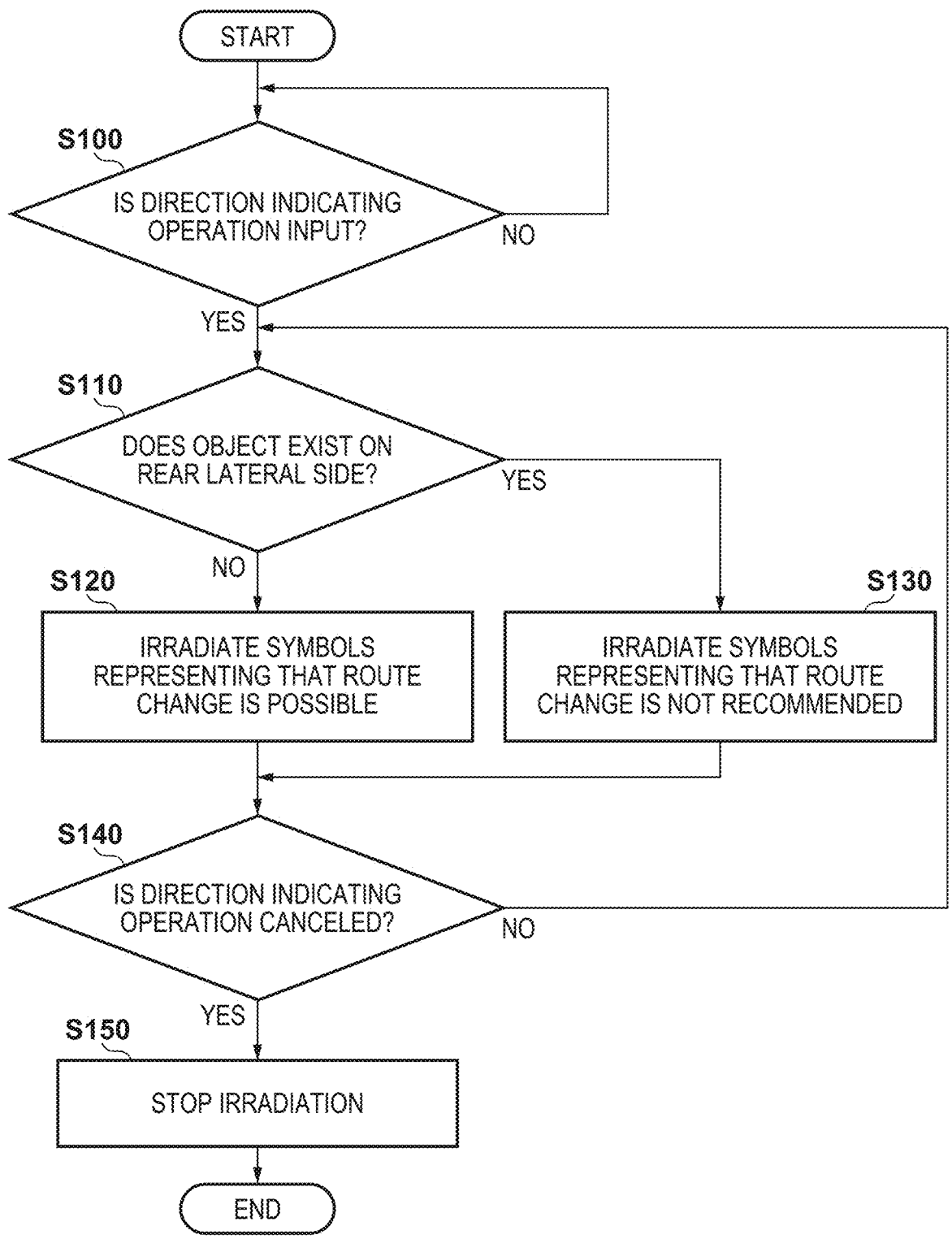
FIG. 6 is a flowchart for explaining an example of an irradiation form by the lighting device.

FIG. 6 is a flowchart for explaining the control form of the front lighting device 12 at the time of the route change of the two-wheeled vehicle 1 and, in particular, the driving form of the projector 123. As the outline, in response to operation contents input to the direction indicator operator 114, the turn signals 122 and 132 are driven, and the light sources 123L$_1$ and the like are driven together. In addition, the driving form of the light sources 123L$_1$ and the like is changed based on the detection result of the detection unit 14. Note that the driving form of the turn signals 122 and 132 is the same as known, and a detailed description thereof will be omitted.

The contents of the flowchart to be described below can be implemented mainly by the direction indicator operator 114, the front lighting device 12, the detection unit 14, and an ECU (Electronic Control Unit) capable of communicating with these via a wire harness or the like. The ECU can generally be formed by a CPU (Central Processing Unit), a memory, and the like. Alternatively, a semiconductor device such as an ASIC (Application Specific Integrated Circuit), a PLD (Programmable Logic Device), or the like may be used.

First, in step S100 (to be simply referred to as "S100" hereinafter, and this also applies to the other steps), it is determined whether a direction indicating operation is input. S100 is performed by detecting an input to the direction indicator operator 114 by the rider. If a direction indicating operation is input, the process advances to S110. Otherwise, the process returns to S100. That is, this flowchart is started in response to input of a direction indicating operation. Note that the turn signals 122 and 132 are driven in accordance with this input.

Next, in S110, it is determined whether another vehicle or the like (a predetermined object whose contact should be avoided, and will be expressed as "another vehicle or the like" herein) exists on the rear lateral side of the two-wheeled vehicle 1. S110 is performed based on the detection result from the detection unit 14. If another vehicle or the like does not exist, the process advances to S120. If another vehicle or the like exists, the process advances to S130.

As described above, the detection unit 14 can detect the peripheral environment of the two-wheeled vehicle 1. In S110, the presence/absence of another vehicle or the like is detected concerning the rear lateral side on the side according to the operation contents input to the direction indicator operator 114 in S100 (that is, the side to which the rider has shown the intention of route change). Hence, in this embodiment, in S110, for example, the presence/absence of another vehicle or the like on the rear lateral side on the side opposite to the side according to the operation contents or the presence/absence of another vehicle or the like on the front side of the two-wheeled vehicle 1 does not matter.

In S120, since it is determined in S110 that another vehicle or the like does not exist on the rear lateral side of the two-wheeled vehicle 1, the light sources 123L$_1$ and the like are driven to display, for example, the arrows A1 and A2 on the road surface as symbols representing that a route change is possible (see FIG. 4A).

In S130, since it is determined in S110 that another vehicle or the like exists on the rear lateral side of the two-wheeled vehicle 1, the light sources 123L$_1$ and the like are driven to display, for example, the arrow A1*b* with an x mark on the road surface as a symbol representing that a route change is not recommended (see FIG. 4B).

In S140, it is determined whether the direction indicating operation input to the direction indicator operator 114 is canceled. If the direction indicating operation is canceled, the process advances to S150. Otherwise, the process returns to S110.

Here, the state on the rear lateral side of the two-wheeled vehicle 1 may have changed during the time from S110 to S140. Hence, if the direction indicating operation is not canceled in S140, and the process returns to S110, for example, if another vehicle or the like appears from the rear lateral side of the two-wheeled vehicle 1, the process advances to S130. For example, if another vehicle or the like disappears from the rear lateral side of the two-wheeled vehicle 1, the process advances to S120. That is, during the time in which the direction indicating operation is not canceled, the information displayed by the light sources 123L$_1$ and the like can be changed in accordance with the state on the rear lateral side on the side to which the rider has shown the intention of route change.

In S150, since the direction indicating operation is canceled in S140, driving of the light sources 123L$_1$ and the like is suppressed to stop road surface irradiation. Simultaneously, the turn signals 122 and 132 are set to the OFF state by canceling the blinking state. S150 is performed when, for example, the rider has completed the route change and reset the direction indicator operator 114.

Figure 7:
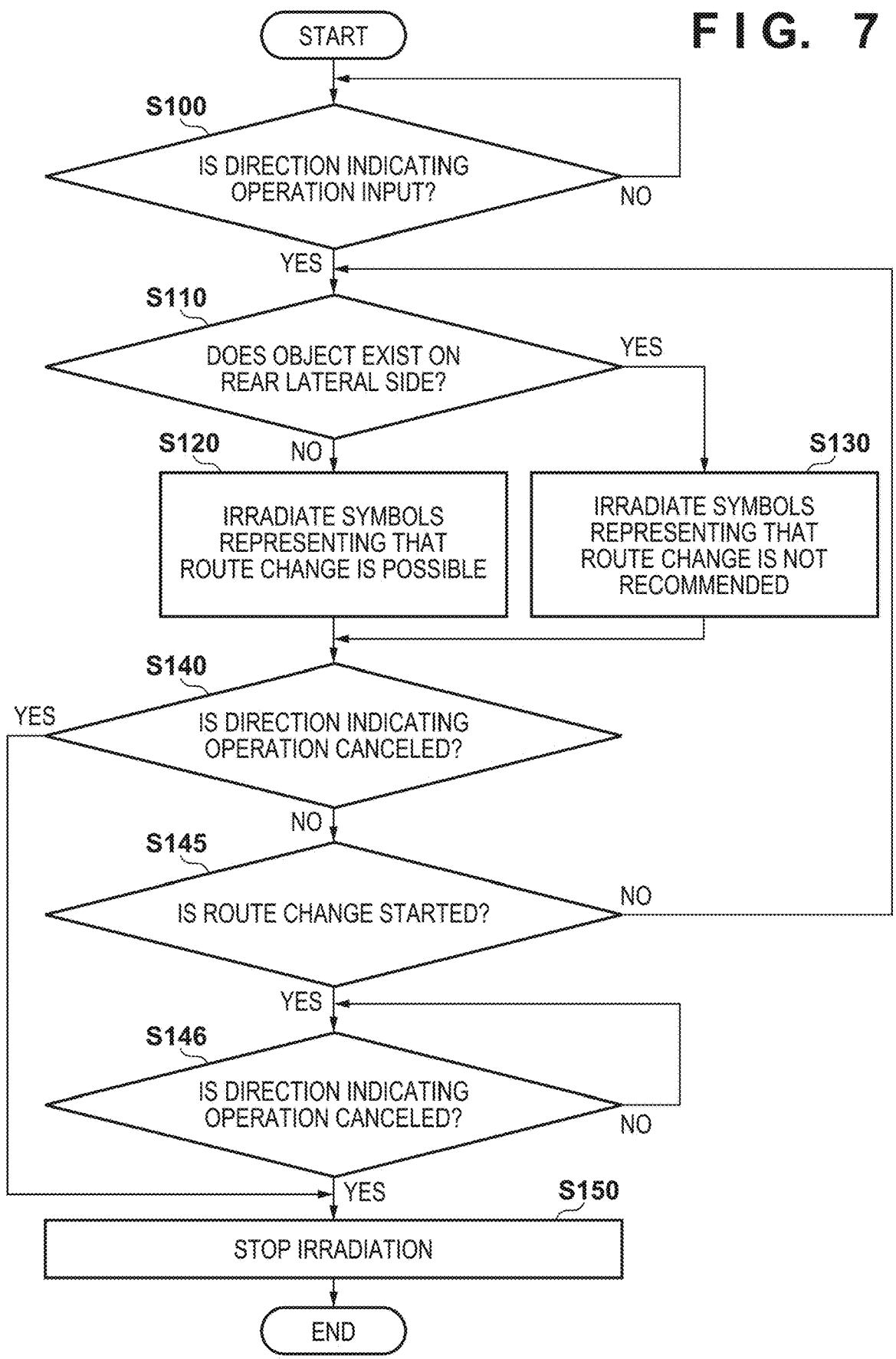
FIG. 7 is a flowchart for explaining an example of an irradiation form by the lighting device.

The flowchart of FIG. 7 exemplarily shows a form in a case in which the two-wheeled vehicle 1 actually makes a lane change, and is different from the example shown in FIG. 6 in that S145 and S146 are added. S100 to S130 and S150 are the same as in FIG. 6, and a description thereof will be omitted here.

In S140, it is determined whether the direction indicating operation is canceled. If the direction indicating operation is canceled, the process advances to S150. Otherwise, the process advances to S145. S145 is performed when the rider executes the route change. If the route change is started, the process advances to S146. Otherwise, the process returns to S110. The contents of S146 are the same as those of S140.

For example, if the direction indicating operation is canceled in accordance with completion of the route change, the process advances to S150. Otherwise, the process returns to S146.

The control form of the front lighting device 12 at the time of route change of the two-wheeled vehicle 1 is not limited to the examples shown in FIGS. 6 and 7, and various modifications can be made. For example, in the example shown in FIG. 7, in accordance with the actual start of the route change by the two-wheeled vehicle 1 (S145), for the turn signals 122 and 132, the driving state may be maintained. On the other hand, for the light sources 123L$_1$ and the like, driving may be suppressed to stop road surface irradiation (display of the arrows A1, A2, and A1*b*). That is, the driving operation of the turn signals 122 and 132 is performed by the rider himself/herself. On the other hand, as for the projector 123, the rider drives this before making the route change, and suppression of the driving is automatically performed by the two-wheeled vehicle 1 in accordance with the start of the route change. According to this form, it is possible to prevent a situation in which the two-wheeled vehicle 1 changes the display position of the arrow A1 and the like on the road surface while making the route change and prevent another person from being unnecessarily confused. Note that whether the route change is actually started can be determined in accordance with satisfaction of a predetermined condition that, for example, the two-wheeled vehicle 1 has moved across a lane division line, a G sensor incorporated in the vehicle body 10 has detected an acceleration larger than a predetermined value, or the pivot amount of the handle bar 11 has reached a predetermined amount. Alternatively, this determination can also be implemented by vehicle-to-infrastructure communication or vehicle-to-vehicle communication using Wi-Fi or the like.

In this embodiment, a form in which the arrow A1 or the like is displayed on the road surface as information representing a route change has exemplarily been described. As another embodiment, if a predetermined object exists at the position on the road surface where the information should be displayed, the display of the information may be suppressed. For example, if another vehicle exists at a relatively close position on the front lateral side of the self-vehicle, the arrow A1 is displayed by the light source 123L$_1$ on the vehicle body rear surface of the other vehicle. Additionally, for example, if another vehicle exists at a relatively close position on the lateral side of the self-vehicle, the arrows A2 are displayed by the light source 123L$_2$ on the vehicle body lateral surface of the other vehicle. Hence, if the information representing the route change cannot be displayed at a predetermined position on the road surface because of the existence of a predetermined object such as another vehicle, the driver of the projector 123 may suppress driving of the light sources 123L$_1$ and the like based on the detection result of the object by the detection unit 14.

As described above, according to this embodiment, the lighting device 12 is configured to irradiate a part of the road surface on the front to lateral side of the two-wheeled vehicle 1 when the rider inputs an operation of showing an intention of route change to the direction indicator operator 114. In addition to the turn signals 122 and 132, the position apart from the vehicle body 10 of the two-wheeled vehicle 1 is irradiated, thereby appropriately calling attention to another person. Hence, the rider can cause another person to more appropriately recognize an intention of route change of the self-vehicle in a relatively near future. This is particularly effective when, for example, the position of the self-vehicle is a dead angle position (mainly a position on a lateral or rear side) for the occupant of the other vehicle. In addition, the rider can readily recognize the state in which the self-vehicle is showing the intention of route change, and the driving burden on the rider is thus reduced. This is advantageous in improving the operability at the time of route change.

Several preferred embodiments have been described above. However, the present invention is not limited to these examples, and a part thereof may be changed without departing from the scope of the present invention. In addition, individual terms described in this specification have merely been used for the purpose of explaining the present invention, and the present invention is not limited to the strict meanings of the terms, as a matter of course, and can include equivalents thereof.

For example, the saddle type vehicle indicates a vehicle of a type that causes a driver to straddle the vehicle body to ride. The concept includes not only an motorcycle (including a motorized bicycle and a scooter type vehicle) but also a three-wheeled vehicle (a vehicle with one front wheel and two rear wheels or with two front wheels and one rear wheel) and a four-wheeled vehicle.

The summary of the above-described embodiment will be described below.

According to the first aspect, there is provided a saddle type vehicle (for example, 1) comprising a lighting device (for example, 12), and an operator (for example, 114) configured to perform a driving operation of a direction indicator (for example, 122), wherein the lighting device is configured to irradiate a part of a road surface on a front to lateral side of the saddle type vehicle in accordance with input of an operation of showing an intention of route change to the operator by a driver of the saddle type vehicle.

According to the first aspect, a rider who is the driver of a self-vehicle can cause another person (for example, the occupant of another vehicle) to more appropriately recognize an intention of route change of the self-vehicle in a relatively near future. This is particularly effective when, for example, the position of the self-vehicle is a dead angle position for the occupant of the other vehicle. In addition, the rider can readily recognize the state in which the self-vehicle is showing the intention of route change, and the driving burden on the rider is thus reduced.

In the second aspect, the lighting device displays information (for example, arrows A1, A2, and A1b) representing the route change on the part of the road surface.

According to the second aspect, the information representing the route change is displayed on a part of the road surface such that it is easy to visually recognize, thereby causing another person to appropriately recognize the intention of route change. The information representing the route change is preferably displayed in a region within the range of 1 m to 10 m ahead of the vehicle body. Accordingly, the information is displayed at a position suitable for both the rider and another person and easily visually recognized. Alternatively, the information representing the route change may be displayed in a region within the range of 3 m to 5 m ahead of the vehicle body.

In the third aspect, the information representing the route change includes at least one (for example, arrows A1, A2, and A1b) of a symbol, a figure, and a character.

According to the third aspect, as the information representing the route change and displayed on the road surface, for example, a symbol such as an arrow, a figure such as a triangle, and a character such as an alphabetic character is typically used, and another person can thus appropriately recognize the intention of route change.

In the fourth aspect, the saddle type vehicle further comprises a handle bar (for example, 11) configured to perform a steering operation, and the lighting device displays the information representing the route change at a position overlapping the handle bar in a front-and-rear direction (for example, an X direction) of a vehicle body and shifted to a side of the route change with respect to a vehicle body center.

According to the fourth aspect, the information representing the route change can be displayed at a position easy to recognize not only for another person but also for the rider.

In the fifth aspect, the lighting device includes a projector (for example, 123).

According to the fifth aspect, using a known projector including, as a light source, a projection lamp using an LED or a laser, the information representing the route change can relatively easily be displayed on the road surface.

In the sixth aspect, the direction indicator is provided on the lighting device together with the projector, and a light source of the direction indicator and a light source of the projector are separated.

According to the sixth aspect, the direction indicator and the projector are individually driven, thereby showing the information representing the route change more noticeable for another person.

In the seventh aspect, the saddle type vehicle further comprises a detection unit (for example, 14) configured to detect presence/absence of an object on the periphery of the saddle type vehicle.

According to seventh aspect, for example, the presence/absence of another vehicle on the periphery of the self-vehicle can be detected, and a driving burden on the rider can be reduced.

In the eighth aspect, if the detection unit detects an object in a region on a rear to lateral side of the saddle type vehicle (for example, S110), the lighting device displays information representing that the route change is not recommended (for example, S130).

According to the eighth aspect, if an object exists at a dead angle position, display contents on a part of the road surface are changed, whereby the rider can quickly decide not to make the route change. Since the rider can quickly cancel the driving operation of the direction indicator using the operator, for example, if the object is another vehicle, it is possible to prevent the occupant of the other vehicle from being confused. Note that in the above-described embodiment, as the method of displaying information representing that the route change is not recommended, display is done using an "x" mark. However, another form may be employed.

In the ninth aspect, the lighting device stops the irradiation in accordance with a start of the route change by the saddle type vehicle (for example, S145-S150).

According to the ninth aspect, the irradiation is stopped when the route change of the self-vehicle by the rider is actually started, thereby preventing another person from being confused.

The present invention is not limited to the above embodiments, and various changes and modifications can be made within the spirit and scope of the present invention. Therefore, to apprise the public of the scope of the present invention, the following claims are made.

The invention claimed is:

1. A saddle type vehicle comprising:
 a lighting device configured to irradiate a road surface;
 an operator configured to perform a driving operation of
  a direction indicator; and a detection unit configured to detect presence/absence of an object on the periphery of the saddle type vehicle, wherein, in accordance with input of an operation of showing an intention of route change to the operator by a driver of the saddle type vehicle, the lighting device irradiates a front side of the saddle type vehicle to display first information representing the route change and irradiates a lateral side of the saddle type vehicle to display second information representing the route change if an object is not detected in a region on a rear lateral side of the saddle type vehicle by the detection unit, the first information being displayed in the front side to be recognized by the driver, and the second information being displayed in the lateral side to be recognized by the other person, and the lighting device suppresses the irradiation of the second information if the object is detected in the region on the rear lateral side by the detection unit.

2. The saddle type vehicle according to claim 1, wherein the lighting device includes a projector.

3. The saddle type vehicle according to claim 2, wherein the direction indicator is provided on the lighting device together with the projector, and a light source of the direction indicator and a light source of the projector are separated.

4. The saddle type vehicle according to claim 1, wherein the first information is displayed at a position a predetermined distance ahead of a vehicle body.

5. The saddle type vehicle according to claim 4, wherein the first information is displayed such that the driver recognizes the first information at least without changing a direction of his/her face.

6. The saddle type vehicle according to claim 4, wherein the first information is displayed in a region within a range of 1 meter to 10 meters ahead of the vehicle body.

7. The saddle type vehicle according to claim 4, wherein the first information is displayed in a region within a range of 3 meters to 5 meters ahead of the vehicle body.

8. The saddle type vehicle according to claim 1, wherein the lighting device suppresses the irradiation of the first information and the irradiation of the second information in accordance with an actual start of the route change of the saddle type vehicle.

9. The saddle type vehicle according to claim 8, wherein the detection unit further detects the actual start of the route change.

10. The saddle type vehicle according to claim 1, wherein the lighting device starts the irradiation of the second information if the detection unit changes from a state in which the object is detected to a state in which the object is not detected during a time in which the operation of showing the intention of route change is being input to the operator.

11. The saddle type vehicle according to claim 1, wherein each of the first information and the second information includes at least one of a symbol, a figure, and a character.

12. The saddle type vehicle according to claim 1, further comprising a handle bar configured to perform a steering operation, wherein the lighting device displays the first information at a position overlapping the handle bar in a front-and-rear direction of a vehicle body and shifted to a side of the route change with respect to a vehicle body center.

13. The saddle type vehicle according to claim 1, wherein if the detection unit detects the object, the lighting device displays, on the front side of the saddle type vehicle, third information representing that the route change is not recommended.

14. The saddle type vehicle according to claim 1, wherein the lighting device is configured to irradiate, as the second information, information visually different from the first information.

15. The saddle type vehicle according to claim 1, wherein the lighting device stops the irradiation in accordance with a start of the route change by the saddle type vehicle.

* * * * *